Jan. 9, 1923.
S. H. SNUFFER ET AL.
FLYTRAP.
ORIGINAL FILED MAY 28, 1921.
1,441,306.
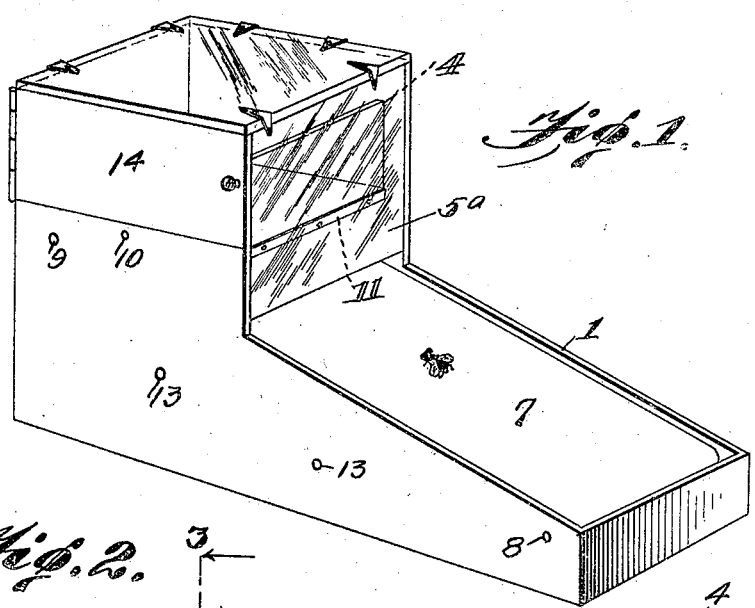
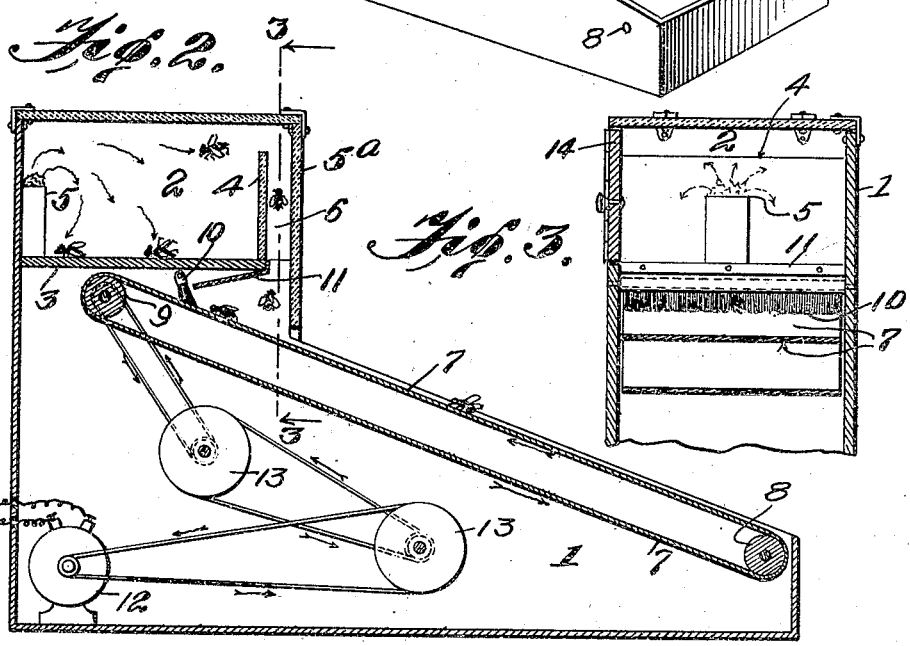
Inventors
Samuel H. Snuffer
Jesse A. Shanks
By E. E. Vrooman & Co.,
Their Attorneys.

Patented Jan. 9, 1923.

1,441,306

UNITED STATES PATENT OFFICE.

SAMUEL H. SNUFFER AND JESSE A. SHANKS, OF DANIELS, WEST VIRGINIA.

FLYTRAP.

Application filed May 28, 1921, Serial No. 473,560. Renewed December 6, 1922.

*To all whom it may concern:*

Be it known that we, SAMUEL H. SNUFFER and JESSE A. SHANKS, citizens of the United States, residing at Daniels, in the county of Raleigh and State of West Virginia, have invented certain new and useful Improvements in Flytraps, of which the following is a specification, reference being had therein to the accompanying drawings.

This invention relates to insect traps, and more particularly to a fly trap.

The object of the invention is the construction of a simple and efficient trap that employs an endless conveyor for quickly conveying the insect into the trap and then the insect is permitted to enter a compartment and be killed therein.

With this and other objects in view, our invention comprises certain novel combinations, constructions and arrangements of parts as will be hereinafter described, illustrated in the accompanying drawings, and more particularly pointed out in the appended claims.

In the drawings:

Figure 1 is a perspective view of the trap, while

Figure 2 is a longitudinal, central, sectional view of the same.

Figure 3 is a sectional view, taken on line 3—3, Fig. 2, and looking in the direction of the arrows.

Referring to the drawings by numerals, 1 designates the casing provided with a glass covered compartment 2; this compartment 2 is formed by a portion of the casing, horizontal floor 3 and a vertical partition 4; the partition 4 is spaced from the glass front 5ª so as to allow insects or flies to pass up through the passage 6 and into the compartment 2. In the compartment, at 5, is a suitable fumigant or deodorizer of sufficient strength to kill the insects or flies as they arrive in the compartment.

An endless conveyor belt 7 is positioned upon rollers 8 and 9 and on the outer face of the conveyor 7 is placed a substance of sweet material, such as honey or syrup, to attract the insects or flies. It is to be noted that the conveyor is preferably arranged in an inclined position within the casing 1, and that its upper end (roller 9) is positioned close to the floor 3 of compartment 2, and positioned between the floor 3 and belt 7 is a brush 10. This brush brushing or frightening the insects so that as they approach the relatively dark space under the floor and touch the brush, they will immediately leave the conveyor 7 and pass up the bright and well-lighted passage 6 into the compartment 2. An angle guard plate 11 is fastened to the front edge of floor 3 and extends downwardly and rearwardly, its inner end being placed close to the brush, so that the insects will have to pass up into the passage 6 and thence into the compartment 2.

Any suitable means may be employed for driving the conveyor 7 but in Fig. 2 we have shown an electric motor 12 belted to the roller 9 for driving the conveyor 7, whereby the insects or flies are conveyed into the casing under floor 3. In belting up the motor 12 to the roller 9, we use wheels or pulleys 13 for reducing the speed so that the conveyor will travel slowly, or as the operator desires.

A door 14 is mounted upon the side of the casing to allow access to the compartment 2, for the purpose of removing the insects, or replenshing the fumigant or deodorizer, at 5.

While we have described the preferred embodiment of our invention, and have illustrated the same in the accompanying drawings, certain minor changes or modifications may appear to one skilled in the art to which this invention relates, during the extensive manufacture of the same and we, therefore, reserve the right to make such modifications or changes as shall fairly fall within the scope of the appended claims.

What we claim is:

1. In a device of the class described, the combintaion of a casing provided in its upper portion with a compartment, said compartment being formed by a portion of the casing, a floor and a vertical partition, the vertical partition being spaced from the front of the casing producing a passage between the front of the casing and the partition, and a conveyor means passing under said passage, as and for the purposes set forth.

2. In a device of the class described, the combintion of a casing provided in its upper portion with a compartment, said compartment being formed by a portion of the casing, a floor and a partition, a transparent front positioned in front of and spaced from said partition, thereby forming an illuminated passage, said transparent front depending below said floor, an inclined conveyor extending into said casing contiguous to the depending portion of said transparent front and up under said floor, whereby said conveyor passes under said passage, so that after insects are carried into said casing and leave the conveyor they will be held from escaping and directed into said passage by the depending portion of said transparent front, as and for the purposes set forth.

3. In a device of the class described, the combination of a casing, provided in its upper portion with a compartment, an illuminated passage formed on the front of said compartment, a conveyor extending into said casing across the lower end of said passage, means for frightening flies from said conveyor after they are carried into said casing, and an inclined guard plate secured to said compartment at the lower end of said passage and extending to said means, whereby flies will be directed into said passage, as and for the purposes set forth.

In testimony whereof we hereunto affix our signatures.

SAMUEL H. SNUFFER.
JESSE A. SHANKS.